United States Patent [19]

Falck, Jr.

[11] 3,952,285

[45] Apr. 20, 1976

[54] SECURITY POLLING TRANSPONDER SYSTEM

[75] Inventor: Melvin S. Falck, Jr., Granada Hills, Calif.

[73] Assignee: Morse Products Manufacturing, Sylmar, Calif.

[22] Filed: Apr. 21, 1975

[21] Appl. No.: 570,094

[52] U.S. Cl. .......... 340/152 T

[51] Int. Cl.[2] .......... H04Q 9/00

[58] Field of Search .......... 340/152 R, 152 T, 157, 340/408

[56] References Cited

UNITED STATES PATENTS 3,815,093 6/1974 Caretto et al. .......... 340/152 T

*Primary Examiner*—Kathleen H. Claffy
*Assistant Examiner*—George G. Stellar
*Attorney, Agent, or Firm*—Fulwider, Patton, Rieber, Lee & Utecht

[57] ABSTRACT

Transponder apparatus and a corresponding method for use in a security polling system having a central controller and a number of remotely located transponders which are polled sequentially to initiate transmission of status conditions, over telephone lines to the central controller for monitoring. The transponder detects polling signal bursts of a particular frequency from the central controller, and counts the bursts to determine its turn for response. Each response includes two sequential signal bursts of different frequencies, the durations of which define, with the frequency sequence, the status condition being transmitted. Control information is encoded into the lengths and spacings of the polling signal bursts, and is decoded by the transponder, to indicate transmission errors, transponder resetting commands, and remote control commands. Means are also provided at the transponder for transmitting a special alarm code when electrical power is first applied to the transponder, thus indicating the possible substitution of an unauthorized transponder at a protected site.

34 Claims, 11 Drawing Figures

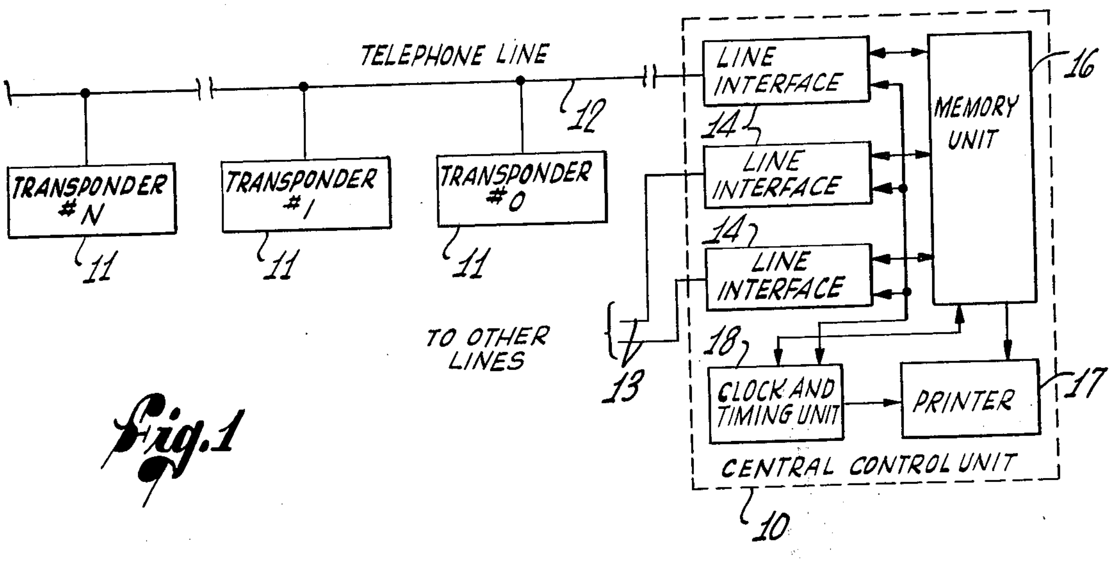
Fig.1
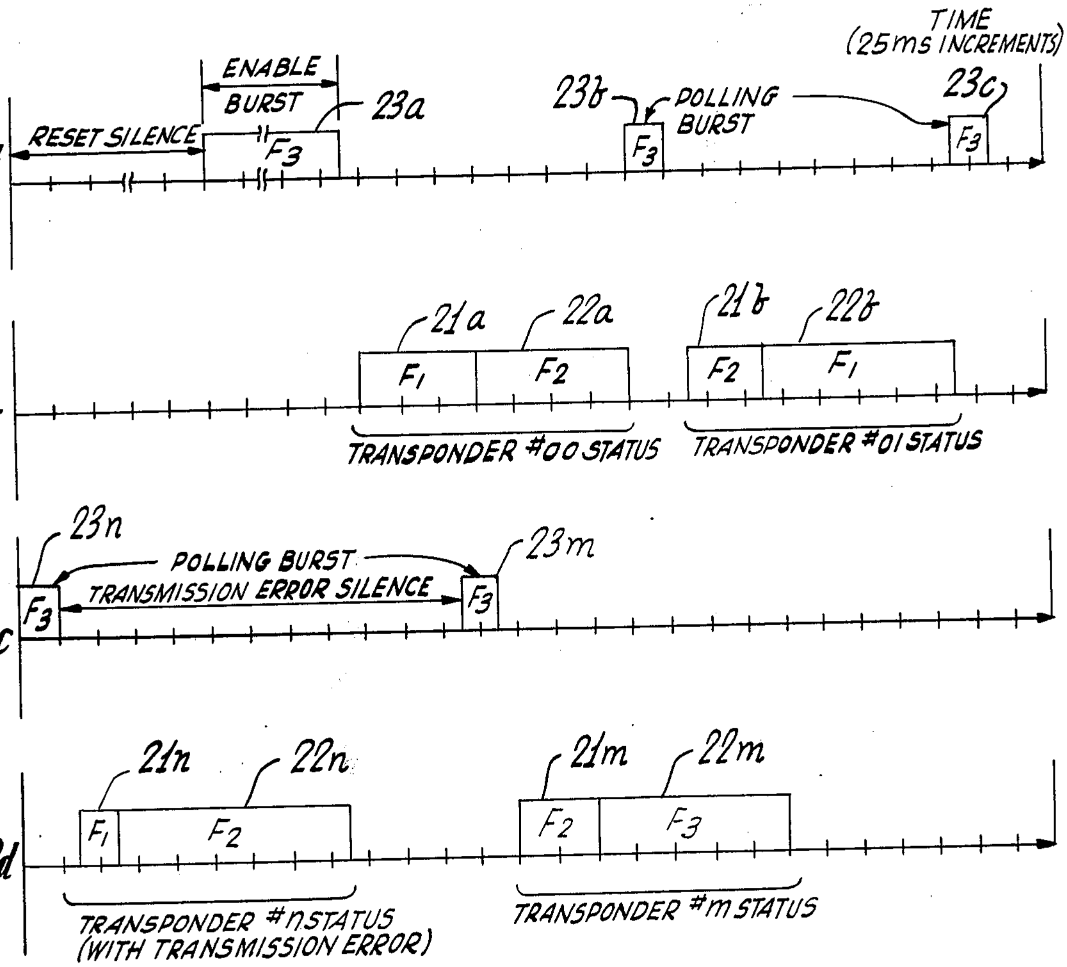
Fig.2a
Fig.2b
Fig.2c
Fig.2d

SECURITY POLLING TRANSPONDER SYSTEM

BACKGROUND OF THE INVENTION

The present invention relates generally to electronic security systems for the protection of property against fire and theft, and, more particularly, to security systems of the type which includes a central controller or monitoring station connected with a number of remote stations at different locations.

Sophisticated equipment for monitoring burglar and fire alarms is relatively expensive, usually too expensive for most owners of small and medium-sized businesses. Consequently, many people prefer to use systems in which a central monitoring facility is capable of monitoring a large number of protected premises. There already exist various systems having a central computer or controller for polling a number of remote transponders connected to the controller by telephone lines, but these prior systems typically have the capability of interrogating only a single alarm condition at each transponder site. More complex systems allowing the monitoring, over telephone lines, of multiple alarm conditions at multiple sites are, of course, well within the state-of-the-art of today's digital communication technology, but a key limiting factor is cost, especially cost of the modem equipment. Complex systems having multi-wire connections to a central site are also available, but again, cost may be a limiting factor.

As mentioned already, the cost of security equipment is, to many buyers, critical. If the cost of a transponder unit having the desired capabilities exceeds the incremental cost of insurance that would be required to cover the premises without installation of the transponder, then the security equipment has little or no commercial value.

It will be appreciated from the foregoing that there is a definite need in the security alarm industry for a security polling system utilizing transponders which are economical to manufacture, but which also have the capability of monitoring and transmitting multiple alarm conditions, and of performing other functions usually only found in expensive multi-wire systems. The present invention satisfies this need.

SUMMARY OF THE INVENTION

The present invention resides in a unique and relatively inexpensive security polling system transponder, one which is capable of monitoring and indicating multiple alarm conditions at a site and of performing other functions usually associated with more expensive equipment.

Basically, and in general terms, the apparatus of the invention includes means for detecting a polling signal from a central controller, and for determining if the polling signal is intended to trigger a response from this particular apparatus, and means for encoding and transmitting a security status condition as a plurality of sequential signal bursts. Each signal burst has a different frequency and a preselected duration, and each security status condition is uniquely identifiable by the sequence in which the different frequencies are transmitted and by the durations of the signal bursts. The modulation technique employed in practicing the invention includes, therefore, a form of frequency shift keying (FSK). Because the signal bursts are of relatively long duration and the data transmission rate is relatively low, the technique allows the use of relatively inexpensive modem components and the immunity to noise encountered in transmission is relatively high. Furthermore, since each security status condition is uniquely identifiable by the encoded signals by which it is transmitted to the central controller, no elaborate hardware or software is required at the central site to decode each received status condition.

More specifically, the polling signals also take the form of signal bursts, of a particular fixed frequency, and, in a system having a number of transponders on a single telephone line, the means for detecting polling signals operates in conjunction with a counter at each transponder. The counter is reset by an absence of polling signals for some predetermined time, and is advanced each time a polling burst is received. Each transponder has associated with it a unique account number, and the means for encoding and transmitting a security status condition is operative only when the count in the counter is equal to the transponder account number. Thus, the transponders on a telephone line are effectively scanned in a cyclic sequence by the polling signals, each polling signal in a cycle eliciting a resonse from a different transponder.

In a presently preferred embodiment of the invention, the status condition to be transmitted is encoded as a sequence of two signal bursts at two designated frequencies, each different from the frequency of the polling signal bursts. Different status conditions are indicated by different burst durations and/or a different sequence of the two frequencies. Although only one status condition can be transmitted from a particular transponder on each scan, a number of status conditions can be monitored at the transponder, and can be stored, if necessary, for subsequent transmission. In any event, the scan time is typically only a few seconds, and many changes in status can, therefore, be quickly conveyed to the central controller.

In accordance with another aspect of the invention, the transponder apparatus also includes means for detecting a transmission error indication sent from the central controller, following transmission of the status condition, and means for retransmitting the status condition in the event that the original transmission was not received, or was erroneously or incomprehensibly received, at the central controller. The transmission error indication in the preferred embodiment is not a special signal, but is merely a longer-than-usual silence before the next polling signal. Thus, a transponder, having just transmitted its status condition, monitors the next polling signal to determine whether the status condition should be retransmitted.

Another important aspect of the invention includes means for detecting the duration of each polling signal burst, and for performing various assigned functions at the transponder in response to the detection of polling signal bursts of various durations. For example, a polling signal burst of a certain preselected duration is used to indicate a socalled "ring-back" signal from the central controller. As is well known in the security systems art, a ring-back signal is typically employed to indicate that a transponder has been placed in active condition, usually by the owner about to leave the premises for the night. On receipt of the ring-back signal at the transponder, the owner is reassured that the central controller is fully operative, and a delay of some seconds is provided to allow him to leave the premises without activating any burglar alarms. Polling signal bursts of other lengths may be utilized to actuate remote outputs of various kinds, so that an operator at the central controller can actuate devices at any transponder site, if necessary.

As a further refinement, the initial polling signal burst in a scanning sequence is much longer than the others which follow. This longer enabling burst must be detected before a transponder is "enabled" following a silence period which resets the transponder. If an enabling burst were not required, a transponder with automatic gain control might well interpret noise on the line as a short polling signal burst during the long reset silence.

It will be understood that the status condition to be transmitted from the transponder can be selected on the basis of any desired priority rules, which, of course, are incorporated into the logical design of the transponder. It should also be apparent that all of the transponders in a system need not be identical in this respect. Some, for example, may be for fire protection only, and some for burglary protection only, and each may have different priorities with regard to the various status conditions. In general, however, each transponder will include a number of local inputs, and possibly a storage device to retain alarm conditions for a time, either because the conditions are momentary but important, or because they must be stored for retransmission in the event of a transmission error. Each transponder also includes priority selection logic, the details of which, as already mentioned, are a matter only of design choice, status encoding logic for generating from the selected status condition the parameters of the response to be transmitted, and oscillator control logic for generating from those parameters appropriate signals for the control of two transmitter oscillators.

In accordance with a further important aspect of the invention, the transponder apparatus may also include "substitution logic" whose purpose is transmit a special status condition, instead of one normally selected for transmission, in the event of the detection of a condition indicative of the possible substitution of the transponder apparatus by an unauthorized replacement transponder. In the presently preferred embodiment, the condition utilized is one which is indicative of the application of electrical power to the transponder. This power-turn-on condition might be an indication of tampering with the transponder, or of replacing it with another transponder for unauthorized purposes. A power-turn-on signal is utilized to inhibit transmission of the normally selected status condition, for the time being, and to initiate transmission of a special alarm status code. If the special status code is correctly received at the central controller, i.e., no transmission error indication is received at the transponder, the normally selected status condition will then be encoded and transmitted as usual.

Basically, the method of the invention includes the steps of detecting at a transponder a polling signal transmitted from the central controller and intended to trigger transmission at the transponder, and transmitting a response signal which includes a plurality of signal bursts each of a preselected frequency and a preselected duration, each possible status condition at the transponder corresponding to a unique response signal defined by a particular sequence of frequencies and by particular durations of the signal bursts. The basic method may also include the step of monitoring the next-occurring polling signal to determine whether transmission was successful.

In more specific terms, the method of the present invention includes detecting the presence or absence of a polling signal burst of fixed frequency transmitted from the central controller, timing the periods of presence and absence of the polling signal bursts, and controlling transmission of encoded status conditions in accordance with the timed lengths of the polling signal bursts and spacings between the bursts.

In addition, the method of the present invention may include detecting a "reset silence" of predetermined length, resetting an account number counter in response thereto, detecting an "enable burst" of preselected length, enabling advancement of the counter in response thereto, detecting subsequent polling bursts of shorter length, and advancing the counter in response thereto, after comparing the counter contents with the transponder account number. If the comparison is successful, the steps which follow are: selecting a status condition for transmission, generating transmission parameters for the selected status condition, and controlling transmitter oscillators to transmit the encoded status condition. Finally, the timing step is again utilized to determine the time of occurrence of the next polling burst and, from this, whether the transmission was correctly received.

It will be apparent from the foregoing summary that the present invention represents a significant advance in transponders for polled security systems. In particular, the technique of the present invention provides for the encoding of status conditions as uniquely identifiable codes, and for the detection of polling signals with various meanings. Consequently, both the transponders and the central controller can be manufactured at relatively low cost, and yet provide a versatile and sophisticated protection system. Other aspects and advantages of the invention will become apparent from the detailed description which follows, taken in conjunction with the accompanying drawings.

BRIEF DESCRIPTION OF THE DRAWINGS

FIG. 1 is a block diagram of a complete security polling system incorporating transponders which may be constructed in accordance with the present invention;

FIGS. 2*a*–2*d* are signal timing diagrams showing the signals typically received and transmitted by the transponders of FIG. 1;

DESCRIPTION OF THE PREFERRED EMBODIMENT

Figure 3:
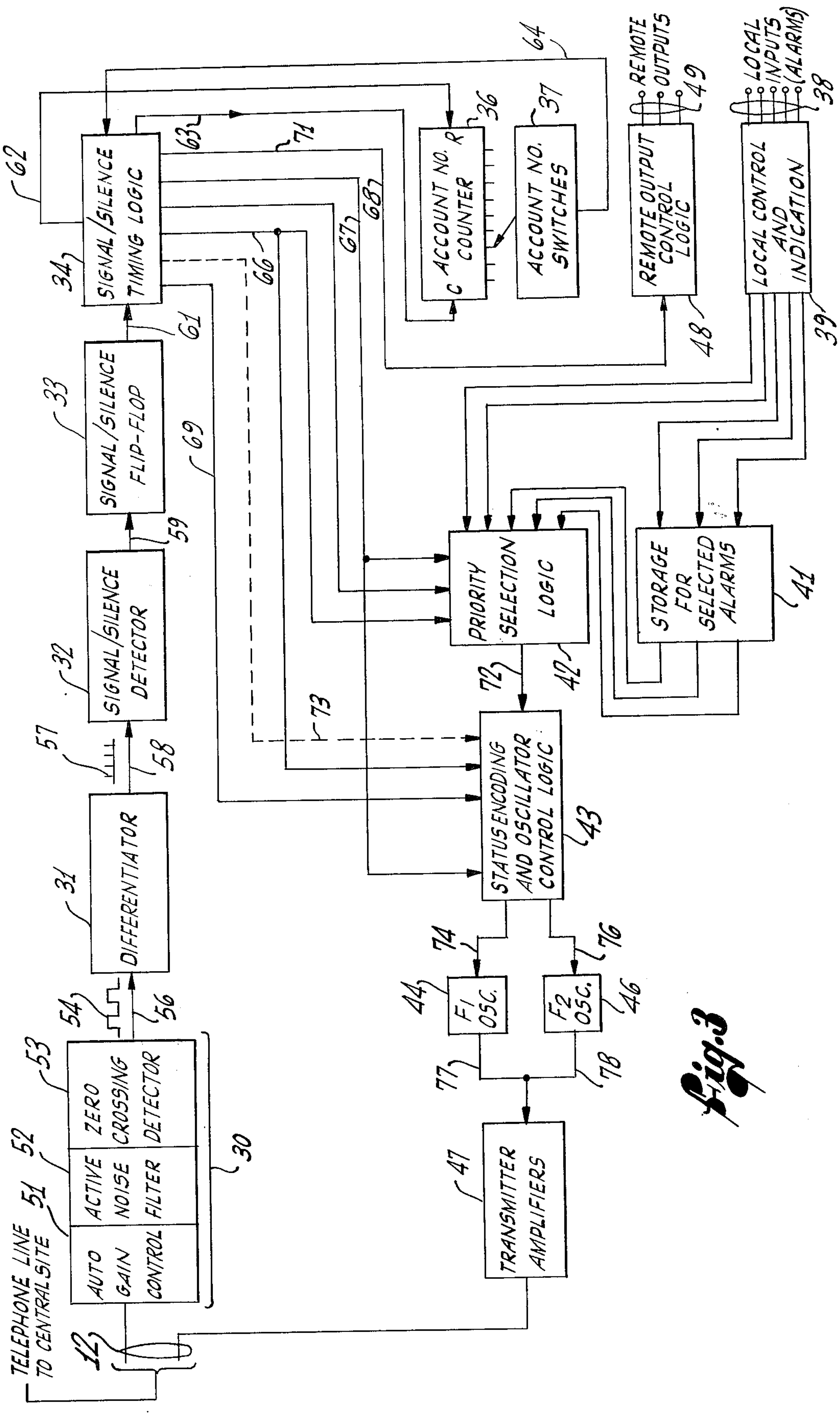
FIG. 3 is a system block diagram of the transponder apparatus of the present invention.

As shown in the drawings for purposes of illustration, the present invention is embodied in a transponder for use in a security alarm monitoring system of the type having a central controller, indicated by reference numeral 10 in FIG. 1, and a number of transponders 11 connected to the central controller by a telephone line 12. Other transponders may be connected to the central controller 10 by additional telephone lines 13, if the central controller is appropriately designed to accommodate them.

The central controller 10, which does not form a part of the present invention, may take the form of a hard-wired unit or of a programmed minicomputer or microprocessor. In general, it will include a line interface unit 14, which includes polling signal generation circuitry, for each of the telephone lines 12 and 13, a memory unit for storing previously received status conditions from the transponders 11, a printer 17 or other display device of some kind, for selectively indicating changes in the monitored status conditions, and a clock and timing unit 18 for directing operations of the controller 10.

The central controller 10 must have the ability to monitor a number of status conditions at each transponder site, the status conditions corresponding to the states of various detection devices for protection against fire and theft at the transponder sites. Ideally, each transponder should transmit the status conditions as uniquely identifiable codes, so that the received conditions can be readily utilized at the central site without complex hardware or software. If it is also highly desirable that the transponders 11 be capable of receiving and acting upon control information transmitted by the central controller 10. Although systems with multiple transponders are presently available, they do not meet all of these requirements.

In accordance with the present invention, and as illustrated in the timing diagram of FIGS. 2*a* and 2*b*, each transponder 11 encodes and transmits a status condition as a sequence of signal bursts, e.g., 21*a*, 22*a*, 21*b* and 22*b*, of different frequencies and time durations, in response to polling signals 23*a* and 23*b*. As shown in FIGS. 2*a* and 2*b*, the polling signals 23 take the form of bursts at a particular frequency, an audio frequency designated "F3" in the figures, and the transponder response signals each take the form of a first signal burst 21 immediately followed by a second signal burst 22, where each burst may have one of two frequencies, designated "F1" and "F2", and have a particular duration. Each status condition to be transmitted from the transponders 11 is defined by a different combination of first and second signal bursts 21 and 22.

In the example given in FIGS. 2*a* and 2*b*, the status of the first transponder polled is encoded as an F1 burst (21*a*) three increments of time in duration, followed by an F2 burst (22*a*) four increments long. An increment of time is some arbitrary period, as, for example, 25 milliseconds.

More detailed aspects of the timing relationships illustrated in FIGS. 2*a*–2*d* will become clearer after a discussion of the details of the transponder apparatus. It is sufficient to this point to understand that each of the transponders 11 (FIG. 1) transmits in its turn a status response 21-22 on detection of a polling signal 23; i.e., the first polling signal in a sequence elicits a response from a first transponder (number 00), the second polling signal elicits a response from a second transponder (number 01), and so on.

FIG. 3 illustrates the apparatus of the invention in block diagram form. As can be seen from the figure, the transponder 11 (FIG. 1) includes an analog modem receiver 30 connected to receive signals from the telephone line 12, a differentiator 31, a signal/silence detector 32, a signal/silence flip-flop 33, signal/silence timing logic 34, an account number counter 36, and account number switches 37.

Of course, the apparatus also includes a plurality of local inputs 38 for connection to various sensing devices (not shown) used in the detection of fire or theft. Further included are local control and indication circuitry 39, storage 41 for selected alarm conditions, priority selection logic 42, status encoding and oscillator control logic 42, F1 and F2 oscillators 44 and 46, and transmitter amplifiers 47. Finally, the apparatus may include remote output control logic 48 and a plurality of remote outputs 49 to allow remote control of equipment at the transponder site from the central site.

The analog modem receiver 30, includes three basic, conventional components: an automatic gain control 51, an active noise filler 52 and a zero-crossing detector 53. The automatic gain control 51 ensures a relatively constant amplitude level of received signal, and the noise filter is essentially a band-pass filter which suppresses received signals not in the region of frequency F3. The zero-crossing detector 53 generates a square wave, as indicated at 54, from the basically sinusoidal received signal. Any conventional design may be employed for the zero-crossing detector 53. A Schmitt trigger circuit with controlled hysterisis is employed in the presently preferred design.

The square wave 54 is input to the differentiator 31 over line 56, and the differentiator produces therefrom a train of narrow pulses, indicated at 57, on line 58 to the signal/silence detector 32, one pulse per zero-crossing of the original F3 signal. The signal/silence detector 32 measures the times between adjacent pulses incoming on line 58, determines whether or not the pulses are derived from a frequency of F3, and sets or resets the signal/silence flip-flop 33 accordingly, as shown by line 59. It will be appreciated that noise "spikes" generated on the telephone line 12 may escape filtering and appear at the signal/silence detector 32, which, as will be discussed further in connection with FIG. 4, must be able to distinguish them from real F3 pulses.

Figure 5:
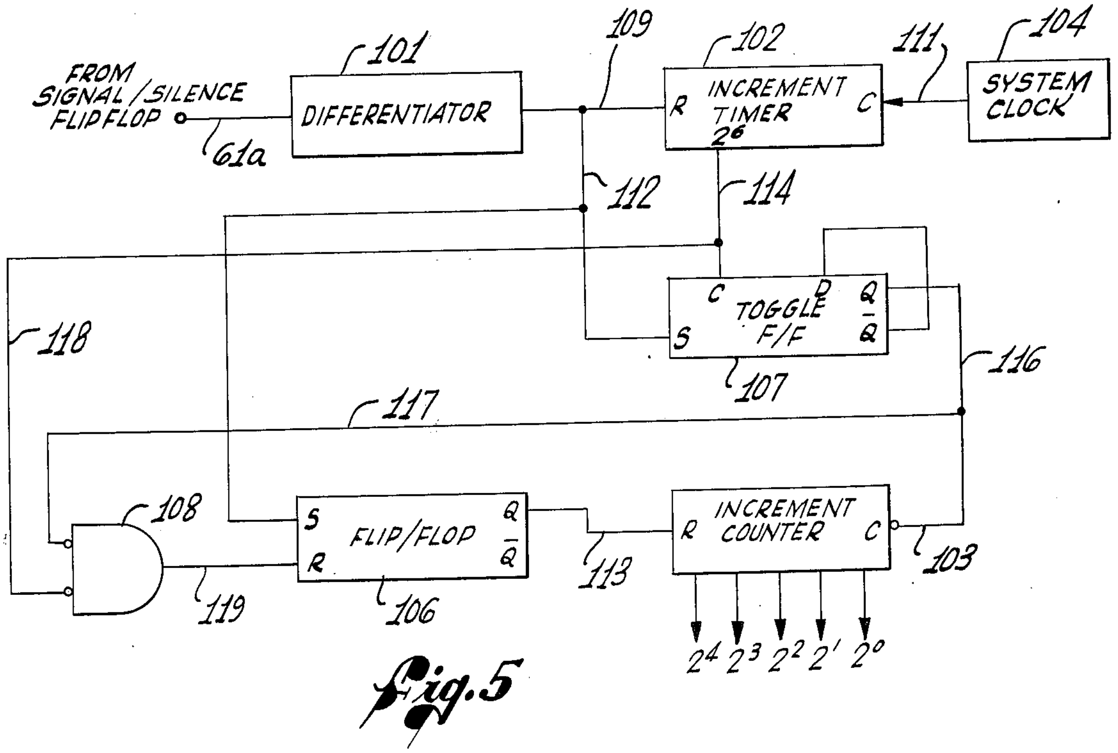
FIGS. 5 and 6 together comprise a simplified logic diagram of the signal/silence timing logic of FIG. 3.
Figure 6:
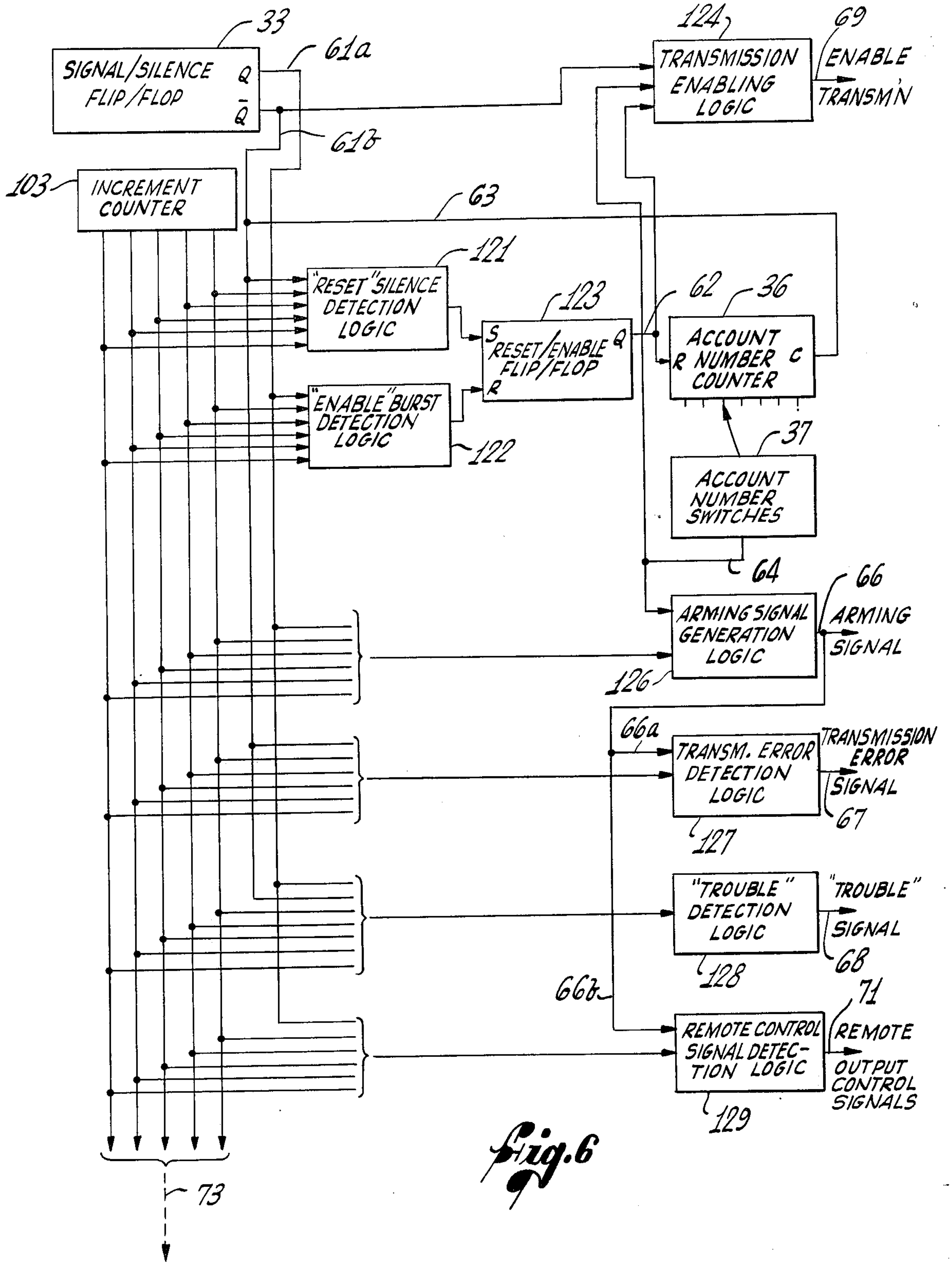

The signal/silence timing logic 34 monitors, over line 61, the condition of the signal/silence flip-flop 33, and, as will be seen when FIGS. 5 and 6 are discussed in detail, is the principal control element in the transponder. The timing logic 34 measures both F3 signals times and F3 silence times, or spaces between F3 signal bursts, both of which are important to control of the transponder. Depending on the length of a detected signal or silence, the signal/silence timing logic 34 develops various control signals, as will now be further elaborated.

If a silence of longer than a certain number of time increments is detected, this is interpreted as a "reset silence", and the signal/silence timing logic 34 generates a reset signal on line 62, resetting the account number counter 36 to zero. Following a reset silence, if an F3 signal of longer than a certain duration is detected, the signal/silence timing logic 34 interprets this as an "enable" signal, which conditions the transponder apparatus to be responsive to subsequent polling signals. The enable burst and all subsequent F3 bursts, which are of shorter length, result in the generation of a clocking signal on line 63 to the account number counter 36, at the end of the F3 burst. If the contents of the account number counter 36 corresponds to the settings of the account number switches 37, a signal is generated on line 64, and is utilized by the signal/silence timing logic 34 to generate an "arming signal" on line 66 to the priority selection logic 42, and to the status encoding and oscillator control logic 43. The arming signal indicates that the transponder should be readied for transmission of its selected status condition.

The signal/silence timing logic 34 also generates a "transmission error" signal on line 67 to the priority selection logic 42, if it detects a silence of some preselected length following transmission of the transponder's status condition. The transmission error signal initiates retransmission of the same status condition, in the event that it was not received correctly, or at all, by the central controller 10 (FIG. 1). In similar fashion, a detected F3 signal or silence of a very long time duration is assumed by the signal/silence timing logic 34 to be indicative of a communications failure or an attempt to interfere with the telephone line 12 (FIG. 1). In either case a "trouble" signal is generated on line 68 to the priority selection logic 42, so that appropriate action may be taken. The action taken in the event of a "trouble" signal on line 68 may be identical with that taken on the detection of a transmission error signal; i.e., the most recent status condition to be transmitted will be retransmitted when the transponder is next polled.

The signal/silence timing logic 34 also generates a transmission "enable" signal on line 69 to the status encoding and oscillator control logic 43. This signal indicates that a received polling signal has terminated and that transmission of the response can begin. Finally, the signal/silence timing logic 34 generates remote output control signals on line 71 to the remote output control logic 48. These signals are generated only when polling signals of certain time durations are received immediately following a transmission from the transponder, and are used to control devices connected to the remote outputs 49.

The local inputs 38 are connected through the local control and indication circuitry 39, and, as desired, through the storage 41 for selected alarms, to the priority selection logic 42. The storage 41 may be utilized to hold the conditions of momentary but highly important alarms, or to hold status conditions for retransmission. The priority selection logic 42 is largely a matter of design choice for a particular system and transponder. Certain alarm conditions, such as "hold-up" or certain fire alarms should normally take priority over others, even when the others may be transmitted themselves within a few seconds, on subsequent scans of the transponders. In any event, the only function of the priority selection logic 42 is to select the most important status condition for output on line 72 and ultimate transmission to the central site, using as inputs the arming signal on line 66, the "transmission error" and "trouble" signals on lines 67 and 68, respectively, and all of the alarm and switch conditions from the local inputs 38 and the local control and indication circuitry 39.

The status encoding and oscillator control logic 43, as will be explained in the discussion to follow with respect to FIG. 7, utilizes part of the timing logic 34, as indicated by the broken line 73, and generates signals on lines 74 and 76 for controlling operation of the F1 oscillator 44 and F2 oscillator 46, respectively. The resultant F1 and F2 signal bursts are applied over lines 77 and 78 to the transmitter amplifiers 47, and thence back to the telephone line 12 to the central controller 10 (FIG. 1).

Figure 4:
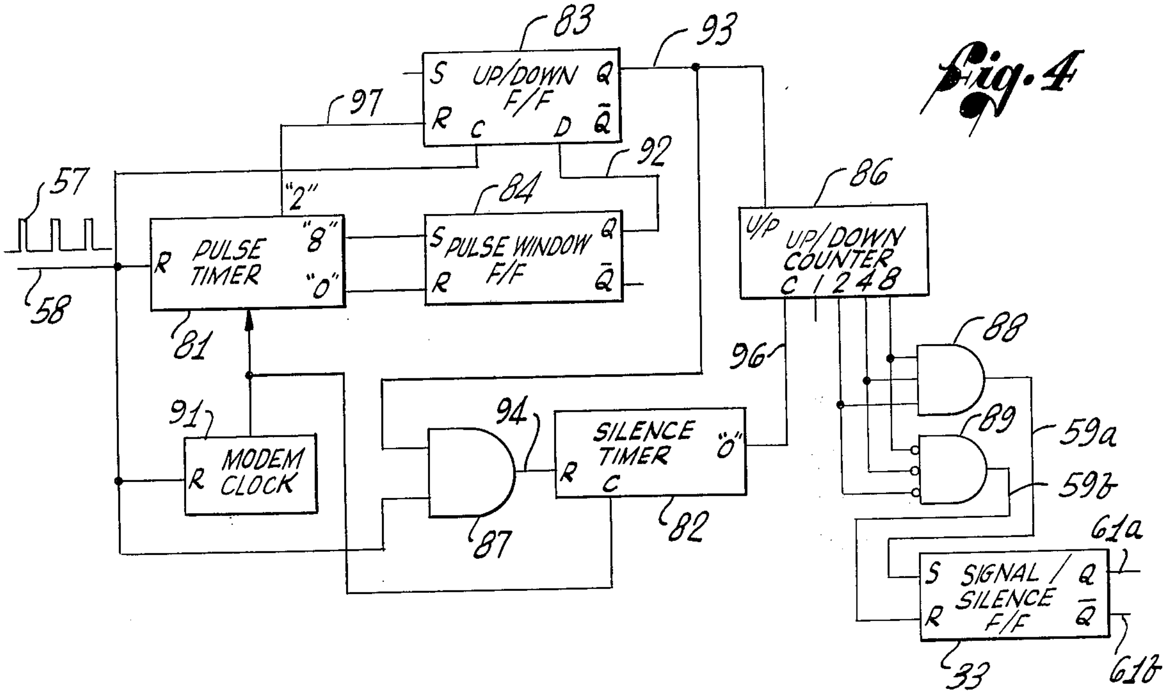
FIG. 4 is a simplified logic diagram of the signal/silence detector logic of FIG. 3.

FIGS. 4–8 illustrate various aspects of the block diagram of FIG. 3 in greater detail. The signal/silence detector 32 is shown in FIG. 4 to include a pulse timer 81, a silence timer 82, an "up/down" flip-flop 83, a "pulse window" flip-flop 84, an up/down counter 86, three AND gates 87, 88 and 89, and a modem clock 91. The pulse timer 81 is a conventional decimal counter which is reset to zero on each incoming pulse on line 58, and is counted cyclicly up from zero through nine, by block pulses on line 92 from the modem clock 91. The modem clock 91 is also reset by incoming pulses on line 58, so that the pulse timer 81 is, in effect, synchronized with the incoming pulses.

It will be seen that the up/down counter 86 has as its purpose to keep a running count of valid F3 pulses received. When a pulse is received within a certain range or "window" of the expected time of arrival of the pulse, as measured from the previous pulse, the up/down counter 86 is counted upwardly. When the arriving pulse falls outside the window, the up/down counter 86 is counted downwardly. Since the up/down counter 86 is a four-bit binary counter with a range of 0–15 decimal, and since up-counts above 15 and down-counts below 0 are ignored, the contents of the counter always represents how many of the last 16 pulses were within range of the expected F3 pulses.

It can be seen that the pulse window flip-flop 84 is set by a count of eight in the pulse timer 81, and is reset by a count of zero in the pulse timer, and that the Q output of the pulse window flip-flop is connected by line 92 to the D terminal of the up/down flip-flop 83. Thus, the up/down flip-flop 83 will be set only when the pulse window flip-flop 84 is set and when a pulse appears on line 58, which is also connected to the clock terminal of the up/down flip-flop. The Q output of the up/down flip-flop 83 is connected by line 93 to the up/down terminal of the up/down counter 86, and to one input of AND gate 87. Line 58 is connected to the other input of AND gate 87, the output of which is connected by line 94 to the reset terminal of the silence timer 82, which is also a conventional digital counter, having its zero output connected by line 96 to the clock terminal of the up/down counter 86.

The manner of operation of the signal/silence detector 32 can be readily appreciated if it is first considered that a pulse has just arrived at the pulse timer 81 on line 58, resetting it to zero, resetting the pulse window flip-flop 84, and allowing the pulse counter to begin counting upwards. At a count of two, an output is generated on line 97 to reset the up/down flip-flop, i.e., to the "down" condition. The counting rate of the pulse timer 81 is chosen such that a count of nine is equivalent to the expected spacing between pulses on line 58. If a pulse should arrive on line 58 between the counts of eight and 10, i.e., eight and zero, this will be regarded as a satisfactory indication of a true F3 pulse. The second pulse will set the up/down flip-flop 83, since its D terminal is set between the counts eight and zero, thus conditioning the up/down counter to count upwardly. At the same time, an output will be produced from AND gate 87 on line 94, resetting the silence timer 82 and causing a "zero" output on line 96 to advance the up/down counter. If the next pulse were to arrive after the pulse timer 81 had counted up through zero again, the silence timer 82 would generate a "zero" output on line 96 as it "wraps around", causing the up/down counter 86 to count downwardly. A continued absence of pulses on line 58 would keep the up/down flip-flop 83 reset in the "down" condition, and would allow the silence timer 82 to generate pulses on line 96 every 10 counts.

As already mentioned, the up/down counter 86 is a conventional four-bit counter, having outputs equivalent to counts of $2^0$, $2^1$, $2^2$ and $2^3$, respectively. AND gate 88 has as inputs the $2^1$, $2^2$ and $2^3$ outputs of the up/down counter 86, while AND gate 89 has the inverse values of those outputs. Thus, an output from AND gate 88 on line **59*a* indicates a count of at least 14, and an output from AND gate 89 on line 59*b* indicates a count of one or less. The AND gate outputs 59*a* and 59*b* are connected to the set and reset terminals, respectively, of the signal/silence flip-flop 33. It will be apparent, therefore, that the signal/silence flip-flop 33** will be set when at least 15 of the last 16 pulses have occurred within the pulse "window", and that the signal/silence flip-flop will be reset when no more than one of the last 16 pulses has occurred within the pulse window.

FIG. 5 shows a portion of the signal/silence timing logic 34 which generates a count indicative of the elapsed time since the most recent transition between a "signal" condition and a "silence" condition. As shown in FIG. 5, the logic to generate this count includes a differentiator 101, an increment timer 102, an increment counter 103, a system clock 104, two flip-flops 106 and 107, and a negative AND gate 108. The Q output of the signal/silence flip-flop 33 (FIG. 4) is connected by line **61*a* to the differentiator 101, which generates an output pulse each time there is transition from signal to silence, or vice versa. This transition pulse is fed over line 109 to the reset terminal of the increment timer 102, which is a conventional binary counter clocked with signals on line 111 from the system clock 104, and also fed over line 112 to the set terminal of flip-flop 106, the Q output of which is connected by line 113 to the reset terminal of the increment counter 103, and also to the set input of flip-flop 107**.

It will be apparent from FIG. 5 that, on the occurrence of a transition pulse from the differentiator 101, both the increment timer 102 and the increment counter 103 are reset to zero, and the Q output of flip-flop 107 is set to one. The increment timer 102 and system clock 104 are selected so that output pulses are generated on line 114 from one of the binary stages of the timer at a rate exactly twice a desired incremental timing rate. These pulses are transmitted over line 114 to the clock terminal of flip-flop 107, which is connected in a toggle configuration, and therefore functions as a divide-by-two circuit, generating pulses at its Q output at the desired rate for connection by line 116 to the clock terminal of the increment counter 103.

The Q output of the toggle flip-flop 107 is also connected, by line 117, to negative AND gate 108, the other input being from the increment timer output over line 118. The output of the negative AND gate 108 is connected by line 119 to the reset terminal of flip-flop 106. Inspection of this logic will show that flip-flop 106 is set simultaneously with the occurrence of a transition pulse with the differentiator 101, and is reset one increment later. The increment counter 103 receives clocking signals on line 116 once every time increment at "half-increment time", i.e., at 0.5, 1.5, 2.5 increments, and so on. Since flip-flop 106 holds the increment counter 103 in the reset condition for the first clocking pulse, the counter misses the clocking pulse at 0.5 increment, and contains a count of one at 1.5 increments of time from the transition, two at 2.5 increments, and so on. This half-increment of displacement is utilized by associated logic to provide a half-increment delay between the trailing edge of a received polling signal and the beginning of a transmitted response.

The remainder of the signal/silence timing logic 34 comprises, as shown in FIG. 6, reset silence detection logic 121, enable burst detection logic 122, a reset/enable flip-flop 123, transmission enabling logic 124, arming signal generation logic 126, transmission error signal detection logic 127, trouble detection logic 128, and remote control signal detection logic 129. As indicated previously, in the discussion of FIG. 3, the signal/silence timing logic 34 operates to generate a number of control signals in response to the monitored conditions of the increment counter 103 and the signal/silence flip-flop 33, since these latter two components completely define the duration and spacing of the signals received at the transponder. The increment counter 103 is a conventional binary counter having five levels of output ranging in significance from $2^0$ through $2^4$, and indicated collectively in FIG. 6 by reference numeral 73.

The reset silence detection logic 121 is simply an arrangement of AND gates to determine from the outputs 73 of the increment counter 103, and from the outputs 61 of the signal/silence flip-flop 33, when a silence of a particular length, such as 13.5 time increments, has been detected. When such a silence is encountered, an output signal is generated on line 131 to set the reset/enable flip-flop 123. This, in turn, generates an output signal on line 62 from the Q output of the flip-flop 123, to reset the account number counter 36. In a similar fashion, the enable burst detection logic 122 generates an output to reset the reset/enable flip-flop 123 on detection of a received signal for some predetermined time, such as 13.5 increments.

The transmission enabling logic 124 generates an output signal on line 69 on the basis of signals received on line 64 from the account number switches 37, indicating that the switches match the current setting of the account number counter 36, and on the states of the signal/silence flip-flop 33 and the reset/enable flip-flop 123. Basically, if the account number matches, if the enable signal has been received, and if a polling signal burst has terminated, transmission of a response can be enabled.

The arming signal generation logic 126 generates an arming signal on line 66 when an account number match is indicated on line 64 and a polling signal burst, of any length, is received. As indicated by lines **66*a* and 66*b*, the arming signal is also utilized by the transmission error detection logic 126 and the remote control detection logic 129**, since these two logic units operate only for the detection of a polling signal immediately following a transmission from the transponder.

The transmission error signal detection logic 127 is rendered operative, by means of the arming signal, only during the silence period immediately following the polling signal burst which triggered transmission of a response from this particular transponder. As can be seen in the timing diagrams of FIGS. **2*c* and 2*d*, a polling signal burst 23*n* triggered the response bursts 21*n* and 22*n*** from transponder *n*. Normally, the next polling signal burst **23*m* would immediately follow the second response burst 22*n*, as in FIGS. 2*a* and 2*b*, but is here shown as delayed by a total of 10.5 time increments from the previous polling burst. The transmission error signal detection logic 126 detects the delay time and generates a transmission error signal on line 67**, indicating that the transmission was either not received or was not understandable at the central controller.

In similar fashion, the trouble detection logic 68 provides an indication on line 68 if a signal or a silence endures for longer than some maximum time, such as 16.5 time increments. The remote control signal detection logic 129 is operative only for the polling signal burst immediately following the transmission of a response. The logic 129 detects polling signal bursts of various lengths and generates appropriate control signals on line 71 to direct various remotely located devices at the transponder site. A polling signal burst of a particular designated length can also be used as a "ring-back" signal to indicate to an operator at the transponder site that his placing of the transponder is an active condition, for example, on leaving for the night, has been detected at the central controller, and to allow the operator some predetermined delay to leave the premises without any alarms he may trip being recognized.

It may be seen from FIG. 6, therefore, that the received polling signal bursts and the spacings of silence separating them have various multiple meanings in the operation of the transponder. A long silence resets the transponder account number counter 36, and an ensuing long polling signal enables the reset transponders and polls the first transponder (number 00). Thereafter, subsequent polling signal bursts poll the other transponders in sequence, and may also contain remote control information and indications of transmission errors.

Figure 7:
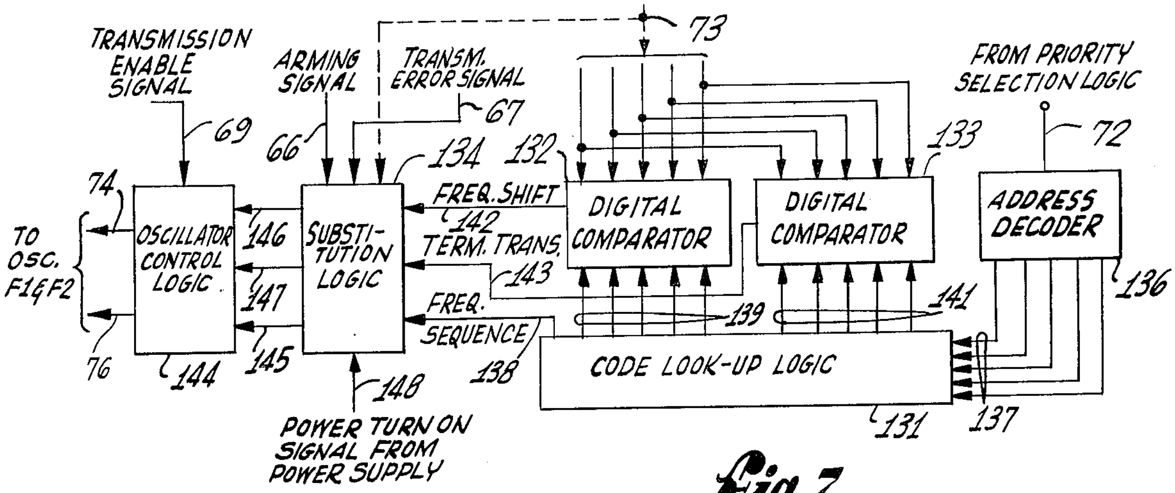
FIG. 7 is a simplified logic diagram of the status encoding and oscillator control logic of FIG. 3.

FIG. 7 illustrates the status encoding and oscillator control logic 43 (FIG. 3). Once the priority selection logic 42 (FIG. 3) has determined which status condition is to be transmitted next, this is fed to the status encoding and oscillator control logic 43 over line 72, and may, at this stage be in the form of a status number. The status encoding logic includes code lock-up logic 131, two digital comparators 132 and 133 and substitution logic 134. Depending on the detailed form of the code-look-up logic 131, an address decoder 136 may also be required. The code look-up logic 131 may include a read-only-memory containing the transmission parameters of each possible transponder response, and being addressable by address lines 137 from the address decoder 136. Alternatively, if the number of possible status conditions is relatively small, the code look-up logic 131 could be conveniently implemented by an arrangement of conventional logic gates.

In any event, the function of the code look-up logic 131 is to generate the necessary parameters to completely define the response signal bursts for the selected status condition indicated on line 72. The parameters provided are a frequency sequence signal on line 138, a frequency-shift time on lines 139, and a terminate-transmission time on lines 141. The frequency sequence signal on line 138 is a single-bit signal indicating which frequency, F1 or F2, is to come first in the response transmission.

The frequency-shift time on lines 139 is a binary representation of the number of time increments for the duration of the first-occurring response signal burst. This frequency-shift time is continuously compared in comparator 132 with the count on lines 73 from the increment counter 103 (FIG. 6), which, it will be recalled, records the number of time increments from the previous transition between received signal and silence. When the frequency-shift time is reached, i.e., the time to shift from the first transmitted frequency to the second, the comparator 132 generates a frequency-shift signal on line 142.

In similar fashion, the end-transmission time on lines 141 is compared in the other digital comparator 133 with the output 73 from the increment counter 103 (FIG. 6). When the end-transmission time is reached, a terminate-transmission signal is generated on line 143 from the comparator 133.

The frequency sequence signal on line 138, the frequency-shift signal on line 142, and the terminate-transmission signal on line 143 are connected to the substitution logic 134. As will be explained in connection with FIG. 8, the substitution logic 134 normally just transmits all three signals on lines 138, 142 and 143, through no oscillator control logic 144 on lines 145, 146 and 147, respectively. The oscillator control logic 144 also receives the transmission-enable signal on line 69 from the transmission enabling logic 124 (FIG. 6), and is therefore able to generate oscillator control signals on lines 74 and 76 to control operation of the F1 and F2 oscillators 44 and 46 (FIG. 3).

The substitution logic 134 is actuated only on the receipt of a signal on line 148 indicating that electrical power has just been applied to the transponder. A signal on line 148 is an indication of possible tampering with the system by replacing a transponder with an unauthorized one which may have been obtained illegally for purposes of defeating the protection system. Such a substitute transponder must still be "powered up" at some point in time, and a signal would then be generated on line 148. Essentially, what the substitution logic does on receipt of such a signal is to suppress the response control signals received on lines 138, 142 and 143, and to substitute its own signals, generated internally, for transmission to the oscillator control logic 144 over lines 145, 146 and 147.

Figure 8:
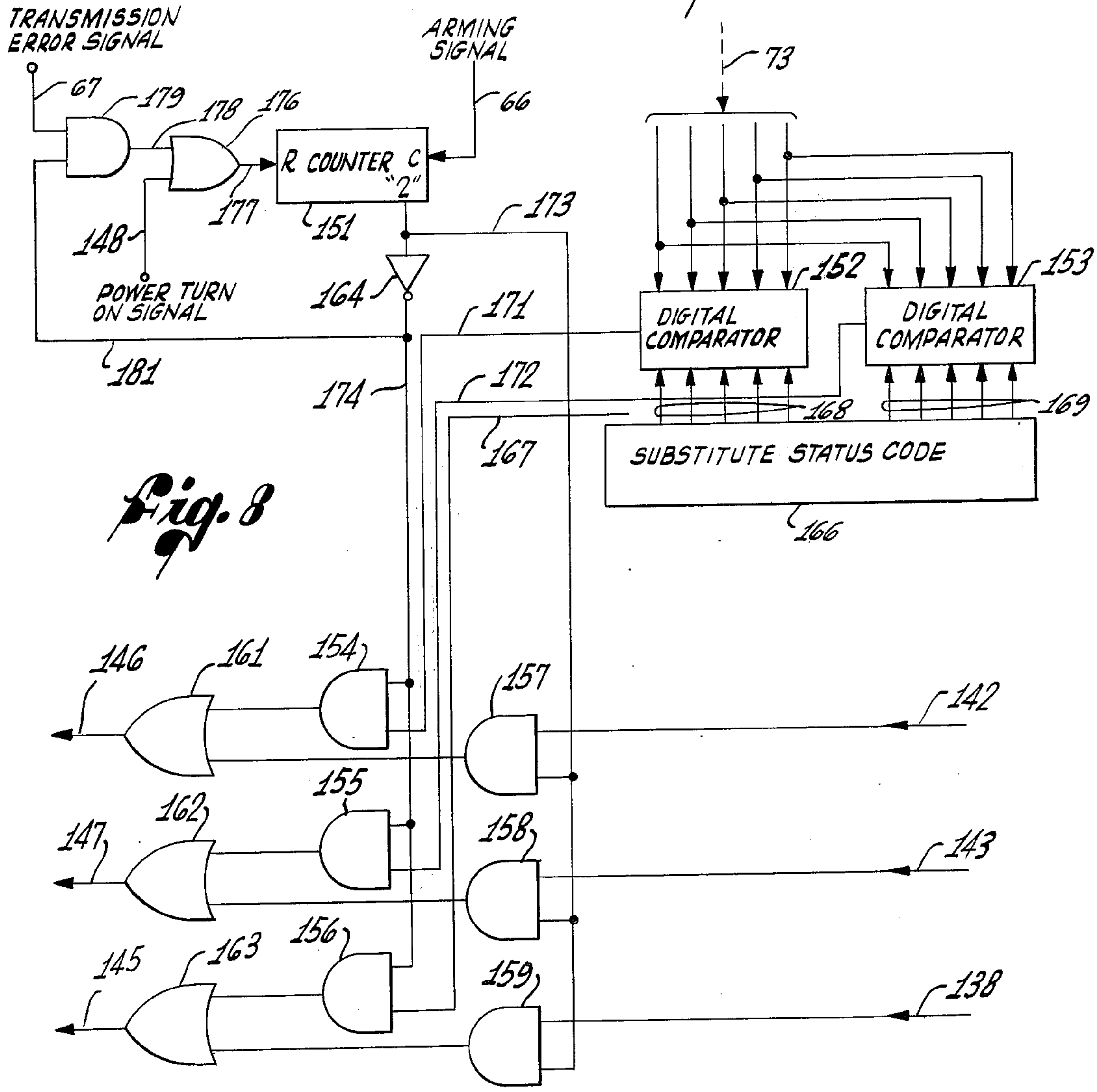
FIG. 8 is a simplified logic diagram of the substitution logic of FIG. 7.

FIG. 8 shows the substitution logic 134 (FIG. 7) in more detail. It includes a counter 151 connected to count from zero through two and to remain in that condition until reset, two additional digital comparators 152 and 153, six AND gates 154–159, three OR gates 161–163, an inverter 164, and a source of substitute status codes 166. The substitute status codes 166 may be in the form of a hard-wired register, and include a one-bit frequency sequence code on line 167, a frequency-shift time on lines 168, and a terminate-transmission time on lines 169. In similar fashion to the status encoding logic of FIG. 7, digital comparator 152 compares the frequency-shift on lines 168 with the count on lines 73 from the increment counter 103 (FIG. 6), and, likewise, the comparator 153 compares the terminate-transmission time on lines 169 with the count on lines 73. A frequency-shift signal is thereby generated on line 171 at the appropriate time, and a terminate-transmission signal is generated on line 172 when it is time to terminate transmission in accordance with the substituted codes.

When power is applied to the transponder, a power-turn-on signal on line 148 resets the counter 151. Subsequent arming signals on line 66 indicate that the transponder is being polled, and increment the counter 151. The "two" output of the counter 151, which, of course, is zero immediately after the counter has been reset by the power-turn-on signal, is applied over line 173 to AND gates 157–159, which effectively inhibit the normal oscillator control signals on lines 138, 142 and 143 from the status encoding logic. The "two"

output on line 173 is also inverted by the inverter 164, and applied over line 174 to the remaining three AND gates 154–156. So long as the "two" output from the counter 151 is zero, AND gates 154–156 are thereby enabled, and transmit the substitute control signals from lines 167, 171 and 172.

As can be seen in FIG. 8, the power-turn-on signal on line 148 is connected as an input to an additional OR gate 176, the output of which is connected by line 177 to the reset terminal of the counter 151. The other input to OR gate 176 is connected by line 178 from the output of a further AND gate 179, the inputs of which are the transmission error signal on line 67 and the inverted "two" outputs of the counter 151, on line 171. Inspection of this gating logic will show that the counter 151 will be reset either by a power-turn-on signal on line 148, or by a transmission error signal on line 67 when the counter has not yet reached a count of two.

When a power-turn-on signal is impressed on line 148, the counter 151 is reset, and the substitute status code is consequently transmitted on the occurrence of an arming signal. If the transmitted code is correctly received at the central controller, no transmission error signal will be detected at the transponder, and a subsequent arming signal on line 66 will increment the counter 151 to a count of two, and the AND gates 157–159 will then enable transmission of signals selected in the normal manner in the status encoding logic.

If any transmission of the substitute status code is not correctly received at the central controller, a transmission error signal will appear on line 67, and, since the "two" output of the counter 151 will still be zero, AND gate 179 will generate an output on line 178 to reset the counter to zero again. Subsequent arming signals on line 66 will, therefore, trigger retransmission of the substitute status code until it is correctly received at the central controller. Thereafter, the normally selected status codes will be transmitted in the usual manner.

The foregoing description provides sufficient detail for any electronics engineer of ordinary skill to make and practice the present invention. In this regard, in order to more clearly highlight the invention, the figures of the drawings, in some instances, include conventional logic which has been simplified or generalized for purposes of illustration and explanation of the invention. While no detailed logic critical to the invention has been omitted, detailed schematics of a typical transponder, embodying the various features of the invention, are also attached hereto in the form of an Appendix, as further clarification and for the convenience of those seeking to practice the invention.

It will be apparent from the foregoing that the present invention represents a significant advance in security polling systems. In particular, the transponder disclosed herein has the capability of encoding and sequentially transmitting a plurality of monitored status conditions to the central controller when interrogated, retransmitting responses in the event of transmission errors, and receiving certain control information from the central controller. Moreover, the modulation technique employed allows the use of relatively inexpensive modem components, and yet is relatively unaffected by noise on the telephone lines.

It will also be appreciated that, although, a particular embodiment of the invention has been described in detail for purposes of illustration, various modifications may be made without departing from the spirit and scope of the invention. Accordingly, the invention is not to be limited, except as by the appended claims.

I claim:

1. For use in a security polling system having a central controller and a plurality of remote transponders, a method of transmitting security status information from a transponder to the central controller, said method comprising the steps of:

detecting polling signals transmitted from the central controller;

determining whether each of the polling signals is intended to trigger transmission from this particular transponder; and transmitting, in response to an affirmative decision in said determining step, a response signal indicative of at least one security status condition at the transponder site, the response signal including a plurality of sequential signal bursts, each of a preselected frequency and duration such that the response signal uniquely identifies the security status condition.

2. A method as set forth in claim 1, and further including the steps of:

monitoring the time of arrival of the next polling signal following said transmitting step;

determining from said monitoring step whether the status condition transmitted was correctly received at the central controller; and retransmitting the status condition if necessary.

3. A method as set forth in claim 1, wherein:

said step of determining whether each of the polling signals is intended to trigger transmission from this particular transponder includes accumulating a count of polling signals detected by said detecting step, and comparing the accumulated count with a transponder number associated with this particular transponder; and said method also includes the additional steps of detecting a reset signal from the central controller to initiate a scan of transponders, and resetting the accumulated count in response to said step of detecting a reset signal.

4. A method as set forth in claim 1, wherein said transmitting step includes:

selecting for transmission one of a possible plurality of status conditions at the transponder site;

generating transmission parameters corresponding to the selected status condition; and controlling a plurality of oscillators in accordance with the generated parameters to produce the required sequence of signal bursts comprising the response signal.

5. A method as set forth in claim 4, and further including the steps of:

monitoring the time of arrival of the next polling signal following said transmitting step;

determining from said monitoring step whether the status condition transmitted was correctly received at the central controller; and retransmitting the status condition if necessary.

6. A method as set forth in claim 4, wherein:

said step of determining whether each of the polling signals is intended to trigger transmission from this particular transponder includes accumulating a count of polling signals detected by said detecting step, and comparing the accumulated count with a transponder number associated with this particular transponder; and said method also includes the additional steps of detecting a reset signal from the central controller to initiate a scan of transponders, and resetting the accumulated count in response to said step of detecting a reset signal.

7. For use in a security polling system having a central controller and a plurality of remote transponders, a method of transmitting security status information from a transponder to the central controller, said method comprising the steps of:

detecting the presence and absence of polling signals transmitted from the central controller as signal bursts of a first particular frequency;

timing the durations of the polling signals and the durations of the periods of silence therebetween;

generating transponder control signals in accordance with the nature of the received polling signals as determined by said detecting and timing steps;

resetting a transponder counter in response to a reset signal generated in said generating step on detection of a silence of predetermined duration;

comparing the contents of the transponder counter with a number associated with this particular transponder, on receipt of a polling signal;

advancing the transponder counter in response to a signal generated in said generating step on receipt of each polling signal; and transmitting, in response to a successful comparing step, a response signal indicative of a status condition at the transponder site, the response signal including two sequential signal bursts having different frequencies chosen from second and third particular frequencies, such that the frequency sequence and durations of the two sequential signal bursts uniquely identify the status condition.

8. A method as set forth in claim 7, wherein said step of generating control signals includes generating an error signal to initiate retransmission if the polling signal received following said transmitting step is spaced more than a predetermined time from the previously detected polling signal.

9. A method as set forth in claim 7, wherein said transmitting step includes:

selecting for transmission one of a possible plurality of status conditions at the transponder site;

generating transmission parameters corresponding to the selected status condition; and controlling two oscillators of the second and third particular frequencies in accordance with the generated parameters, to produce the required sequence of signal bursts comprising the response signal.

10. A method as set forth in claim 9, wherein said transmitting step further includes:

sensing the application of power to the transponder;

temporarily substituting a special set of transmission parameters in response to said sensing step, whereby application of power to the transponder may be indicative of unauthorized tampering.

11. A method as set forth in claim 9, wherein:

the transmission parameters includes a frequency sequence indicator, indicating the frequency of the first signal burst, a shift-frequency indicator, indicating the duration of the first signal burst, and a terminate-transmission indicator, indicating the total duration of the response; and said step of controlling the oscillators includes comparing the shift-frequency indicator and the terminate-transmission indicator with the time since transmission was begun, and generating control signals when comparison is successful.

12. A method as set forth in claim 7, wherein said step of generating control signals includes generating a control signal indicative of possible tampering with equipment if a polling signal or an absence thereof persists for some predetermined minimum time.

13. A method as set forth in claim 7, wherein said step of generating control signals includes generating signals for the control of selected devices at the transponder site in response to polling signal bursts of particular predetermined durations, whereby the duration of the polling signal indicates a control function to be performed.

14. A method as set forth in claim 7, and further including the step of enabling the transponder in response to detection of an enabling polling signal of a particular preselected relatively long duration following said resetting step, whereby the long enabling polling signal will be easily distinguishable from possible noise signals present after the period of silence initiating said resetting step.

15. For use in a security polling system having a central controller and a plurality of remote transponders connected to the central controller by telephone lines, a method of transmitting security status information from a transponder to the central controller, said method comprising the steps of:

detecting the presence and absence of polling signals transmitted from the central controller as signal bursts of a first particular frequency;

timing the durations of the polling signals and the durations of the periods of silence therebetween;

generating transponder control signals in accordance with the durations of the detected polling signals and the periods of silence therebetween, the control signals including a reset signal for resetting a counter in response to a silence of a predetermined duration, an enable signal for enabling the transponder following a reset signal, a counter-advancing signal in response to any received polling signal, a coincidence signal indicating equality of the counter contents with a number associated with this transponder, and a transmission error signal in response to detection of a period of silence of predetermined duration following transmission by the transponder;

resetting, enabling and advancing the counter under direction of the reset signals, enable signals and counter-advancing signals generated in said generating step;

transmitting, in response to the coincidence signal, a response signal indicative of a status condition at the transponder, the response signal including two sequential signal bursts having different frequencies chosen from second and third particular frequencies, such that the frequency sequence and durations of the two sequential signal bursts uniquely identify the status condition, said transmitting step including selecting for transmission one of a possible plurality of status conditions at the transponder site, generating transmission parameters corresponding to the selected status conditions, and controlling two oscillators of the second and third particular frequencies in accordance with the generated parameters, to produce the required sequence of signal bursts comprising the response signals; and retransmitting the same sequence of frequency bursts, if necessary, in response to the transmission error signal, and when the transponder is next triggered to respond.

16. Transponder apparatus for use in a security polling system having a central controller and a plurality of transponders, said apparatus comprising:

means for detecting a polling signal from the central controller, including means for determining whether the polling signal is intended to trigger transmission from this particular transponder; and transmitting means, responsive to said means for detecting a polling signal, for encoding and transmitting a security status condition at the transponder site as a plurality of sequential signal bursts, each of a preselected frequency and duration such that the response signal uniquely identifies the security status condition.

17. Apparatus as set forth in claim 16, and further including:

timing means for monitoring the time of arrival of the next polling signal after transmission of the response signal; and means for initiating retransmission of the response signal if said timing means determines that the original transmission was not correctly received, whereby transmission errors in transmitted status conditions are indicated by the time of occurrence of the next following polling signal.

18. Apparatus as set forth in claim 16, wherein:

said means for determining whether the polling signal is intended to trigger transmission from this particular transponder includes counting means for accumulating a count of detected polling signals, and comparing means for comparing the count in said counting means with a transponder number associated with this particular transponder; and said apparatus also includes means for detecting a reset signal from the central controller, and means for resetting said counting means in response thereto.

19. Apparatus as set forth in claim 16, wherein said transmitting means includes:

priority selection means, for selecting one of a possible plurality of status conditions at the transponder site;

status encoding means for generating response transmission parameters corresponding to the selected status condition; and oscillator control means, for controlling a plurality of oscillators in accordance with the generated parameters to produce the required sequence of signal bursts comprising the response signal.

20. Apparatus as set forth in claim 19, and further including:

timing means for monitoring the time of arrival of the next polling signal after transmission of the response signal; and mean for initiating retransmission of the response signal if said timing means determines that the original transmission was not correctly received, whereby transmission errors in transmitted status conditions are indicated by the time of occurrence of the next following polling signal.

21. Apparatus as set forth in claim 19, wherein:

said means for determining whether the polling signal is intended to trigger transmission from this particular transponder includes counting means for accumulating a count of detected polling signals, and comparing means for comparing the count in said counting means with a transponder number associated with this particular transponder; and said apparatus also includes means for detecting a reset signal from the central controller, and means for resetting said counting means in response thereto.

22. Transponder apparatus for use in a security polling system having a central controller and a plurality of transponders, said apparatus comprising:

polling signal detection means, for detecting the presence and absence of polling signals received from the central controller as signal bursts of a first particular frequency;

timing means, for timing the durations of the polling signals and the periods of silence separating the polling signals;

control means connected with said timing means, for generating transponder control signals in accordance with the durations and spacings of the polling signals;

polling signal counting means, including coincidence means for comparing the count in said counting means with a transponder number associated with this particular transponder; and transmitting means for encoding and transmitting a response signal indicative of a status condition at the transponder site, the response signal including two sequential signal bursts having different frequencies chosen from second and third particular frequencies, such that the frequency sequence and durations of the two sequential signal bursts uniquely identify the status condition.

23. Apparatus as set forth in claim 22, wherein said control means includes means for generating an error signal to initiate retransmission of the response signal if the polling signal detected following transmission is spaced more than a predetermined time from the previously detected polling signal.

24. Apparatus as set forth in claim 22, wherein said transmitting means includes:

priority selection means for selecting for transmission one of a possible plurality of status conditions at the transponder site;

status encoding means, for generating response transmission parameters corresponding to the selected status condition; and oscillator control means, for controlling two oscillators of the second and third particular frequencies in accordance with the generated parameters, to produce the required sequence of signal bursts comprising the response signal.

25. Apparatus as set forth in claim 24, wherein said transmitting means further includes:

means for sensing the application of electrical power to the transponder;

logic means responsive to said sensing means, for temporarily substituting a special set of response transmission parameters, whereby application of power to the transponder is indicated to the central controller without delay since it may be indicative of an unauthorized substitute transponder.

26. Apparatus as set forth in claim 24, wherein:

said status encoding means includes means for generating a frequency sequence indicator, a shift-frequency indicator and a terminate-transmission indicator; and said oscillator control means includes means for comparing the shift-frequency indicator and the terminate-transmission indicator with the time elapsed since transmission was begun, and means for generating oscillator control signals when comparison is successful.

27. Apparatus as set forth in claim 22, wherein said control means includes means for generating a control signal indicative of possible tampering with equipment if a polling signal or an absence thereof persists for some predetermined minimum time.

28. Apparatus as set forth in claim 22, wherein said control means includes means for generating signals for the control of selected devices at the transponder site in response to polling signal bursts of predetermined durations, whereby the duration of the polling signal indicates which control function to be performed.

29. Apparatus as set forth in claim 22, wherein said control means includes:

means for generating a reset signal in response to detection of a silence period of predetermined duration; and means for generating an enabling signal in response to detection of a polling signal of predetermined and relatively long duration following a reset silence period, whereby the long enabling burst will be easily distinguishable from possible noise signals present after the reset silence period.

30. Apparats as set forth in claim 22, wherein said polling signal detection means includes:

zero-crossing detection means for producing a relatively short-duration pulse each time a received signal crosses a zero axis;

pulse timing means for measuring the times between zero crossings;

pulse counting means coupled with said pulse timing means to keep a running count indicative of the number or pulses derived from a received signal of the first particular frequency which occurred during a period defined by a preselected number of most recent pulse times; and decision means coupled with said pulse counting means, for determining whether a polling signal is currently being received, whereby, if said pulse counting means has a capacity of $n$, its current contents indicates the number of pulses detected during the most recent $n$ pulse times.

31. In a transponder for use with a security polling system having central controller and a plurality of transponders, apparatus comprising:

sensing means for sensing application of electrical power to the transponder;

gating means responsive to said sensing means, for inhibiting retransmission of a response signal indicative of a status condition to the central controller, and simultaneously enabling transmission of a special response signal indicative of the sensed condition; and counting means for effecting transmission of the special response signal a predetermined number of times, said counting means being coupled to said gating means to permit normal transmission after the predetermined number of special response transmissions.

32. Apparatus as set forth in claim 31, and further including means for resetting said counting means in response to detection of an error signal indicative of an error in the transmission of the special response signal, whereby the special response signal will be retransmitted until no error signal is detected.

33. For use in a security polling system having a central controller and at least one remote transponder, a method for detecting an unauthorized transponder substitution, said method comprising the steps of:

sensing the application of electrical power to the transponder; and, in response to said sensing step, inhibiting transmission of a normal response signal; and enabling transmission of a special response signal indicative of application of electrical power to the transponder.

34. A method as set forth in claim 33, and further including the steps of:

detecting a transmission error signal indicative of an error in transmission of the special response signal; and enabling transmission of the special response signal if said detecting step determines that there was an error in transmission.

* * * * *

UNITED STATES PATENT AND TRADEMARK OFFICE
CERTIFICATE OF CORRECTION

PATENT NO. : 3,952,285
DATED : April 20, 1976
INVENTOR(S) : Melvin S. Falck, Jr.

It is certified that error appears in the above-identified patent and that said Letters Patent are hereby corrected as shown below:

Column 6, line 7, "42," should be --43,--. Column 11, line 38, "lock-up" should be --look-up--. Column 12, line 16, "no" should be --to--. Column 19, line 37, "Apparats" should be --Apparatus--.

Signed and Sealed this

Seventeenth Day of August 1976

[SEAL]

*Attest:*

RUTH C. MASON
*Attesting Officer*

C. MARSHALL DANN
*Commissioner of Patents and Trademarks*